(12) United States Patent
Iwa et al.

(10) Patent No.: US 10,495,042 B2
(45) Date of Patent: Dec. 3, 2019

(54) DIAPHRAGM DAMPER

(71) Applicant: EAGLE INDUSTRY CO., LTD., Tokyo (JP)

(72) Inventors: Toshiaki Iwa, Tokyo (JP); Yoshihiro Ogawa, Tokyo (JP); Yasushi Fujiwara, Tokyo (JP); Yusuke Sato, Tokyo (JP)

(73) Assignee: Eagle Industry Co., LTD., Tokyo (JP)

( * ) Notice: Subject to any disclaimer, the term of this patent is extended or adjusted under 35 U.S.C. 154(b) by 18 days.

(21) Appl. No.: 15/747,462

(22) PCT Filed: Jul. 28, 2016

(86) PCT No.: PCT/JP2016/072113
§ 371 (c)(1),
(2) Date: Jan. 25, 2018

(87) PCT Pub. No.: WO2017/022603
PCT Pub. Date: Feb. 9, 2017

(65) Prior Publication Data
US 2018/0209389 A1    Jul. 26, 2018

(30) Foreign Application Priority Data
Jul. 31, 2015  (JP) ................................ 2015-152619

(51) Int. Cl.
*F02M 55/04*       (2006.01)
*F02M 59/44*       (2006.01)
(Continued)

(52) U.S. Cl.
CPC ............. *F02M 55/04* (2013.01); *B23K 26/28* (2013.01); *F02M 37/0041* (2013.01);
(Continued)

(58) Field of Classification Search
CPC ....... F16L 55/04; F16F 9/04; F16J 3/02; F16J 15/52
(Continued)

(56) References Cited

U.S. PATENT DOCUMENTS

| 8,262,376 B2* | 9/2012 | Inoue ................. F04B 11/0033 417/540 |
| 8,430,655 B2* | 4/2013 | Kobayashi .......... F02M 59/102 417/540 |
| 8,955,550 B2* | 2/2015 | Oikawa .................. F16L 55/04 138/30 |
| 9,074,593 B2* | 7/2015 | Kobayashi .......... F04B 11/0008 |

(Continued)

FOREIGN PATENT DOCUMENTS

| JP | 2006-159240 A | 12/2004 |
| JP | 2013-227877 A | 11/2013 |
| WO | WO2005026585 A1 | 9/2004 |

OTHER PUBLICATIONS

International Preliminary Report on Patentability dated Feb. 6, 2018.
(Continued)

*Primary Examiner* — Patrick F Brinson
(74) *Attorney, Agent, or Firm* — Grogan, Tuccillo & Vanderleeden, LLP

(57) ABSTRACT

Peripheral sections of two diaphragms are stacked on each other. The peripheral sections of the two diaphragms form an outer rim of a diaphragm damper. The outer rim is continuously sealed and joined by laser welding over the entire circumference of the outer rim. The thickness of the tip of the outer rim is set in correspondence with the spot diameter of a laser beam at the tip of the outer rim. A weld bead is formed by welding in the entire area of the tip of the outer rim.

2 Claims, 4 Drawing Sheets

(51) Int. Cl.
*F16J 3/02* (2006.01)
*F16J 15/52* (2006.01)
*F16F 9/04* (2006.01)
*B23K 26/28* (2014.01)
*F02M 37/00* (2006.01)
*F04B 11/00* (2006.01)
*F04B 39/00* (2006.01)
*F16L 55/054* (2006.01)

(52) U.S. Cl.
CPC ......... *F02M 59/44* (2013.01); *F04B 11/0016* (2013.01); *F04B 11/0033* (2013.01); *F04B 39/0027* (2013.01); *F16F 9/04* (2013.01); *F16J 3/02* (2013.01); *F16J 15/52* (2013.01); *F16L 55/054* (2013.01); *F02M 2200/26* (2013.01); *F02M 2200/315* (2013.01); *F02M 2200/8084* (2013.01)

(58) Field of Classification Search
USPC ...................................... 138/26, 30
See application file for complete search history.

(56) References Cited

U.S. PATENT DOCUMENTS

| | | | |
|---|---|---|---|
| 2008/0289713 A1* | 11/2008 | Munakata | F02M 55/04 138/26 |
| 2010/0162553 A1* | 7/2010 | Matsuki | B23K 26/0823 29/463 |
| 2010/0209274 A1* | 8/2010 | Oikawa | F04B 37/12 417/540 |
| 2011/0209687 A1* | 9/2011 | Schroeder | F02M 63/005 123/459 |
| 2011/0220419 A1* | 9/2011 | Sjodin | B25D 9/145 175/99 |
| 2013/0052064 A1 | 2/2013 | Oikawa et al. | |
| 2013/0276929 A1* | 10/2013 | Oikawa | F16L 55/04 138/26 |

OTHER PUBLICATIONS

Supplementary European Search Report dated Feb. 13, 2019 from corresponding European Application No. 16832882.

* cited by examiner

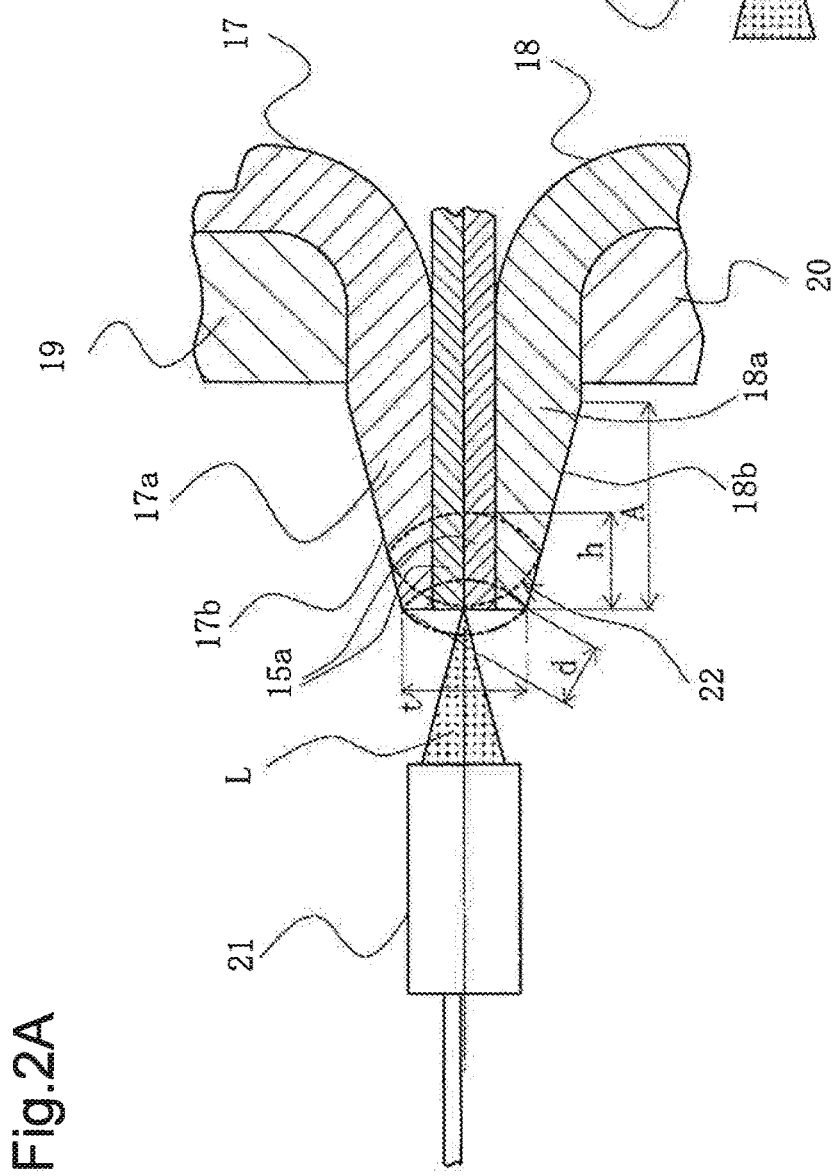
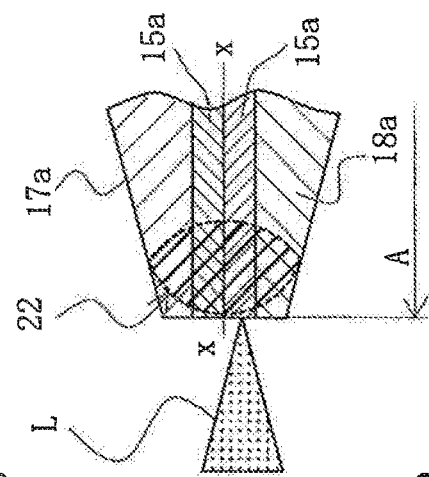
Fig.2A
Fig.2B

DIAPHRAGM DAMPER

TECHNICAL FIELD

The present invention relates to a diaphragm damper for absorbing pulsation, which is used at a position where pulsation occurs in, for example, a high-pressure fuel pump.

BACKGROUND ART

Conventionally, a damper device arranged in a fluid passage of a high-pressure fuel pump, for example, is known as this type of pulsation absorbing device (hereinafter, referred to as the conventional technique. See, for example, Patent Document 1). In the conventional technique, the damper device absorbs pulsation of pressure of the fuel discharged from the high-pressure fuel pump. This decreases the pulsation amplitude of the fuel pressure, thus stabilizing the fuel injection amount.

As shown in FIG. 4A, the damper device according to the conventional technique includes a first diaphragm 50, a second diaphragm 55, a first support member 60, which supports the first diaphragm 50 from below, and a second support member 65, which supports the second diaphragm 55 from above. The first diaphragm 50 is formed by a thin metal plate and has a periphery 51 and a middle section 52, which is recessed downward with respect to the periphery 51. The first diaphragm 50 has a dish-like shape. The second diaphragm 55 is also formed by a thin metal plate and has a periphery 56 and a middle section 57, which is recessed upward with respect to the periphery 56. The second diaphragm 55 has a dish-like shape.

The periphery 51 of the first diaphragm 50 and the periphery 56 of the second diaphragm 55 are stacked on each other. The periphery 51 and the periphery 56 are clamped by a first clamping portion 61 of the first support member 60 and a second clamping portion 66 of the second support member 65 in the vertical direction. The thickness of each of the first clamping portion 61 and the second clamping portion 66 is greater than the thickness of the periphery 51 and the periphery 56. The first clamping portion 61 and the second clamping portion 66 both have a uniform length at any radial position.

The periphery 51 of the first diaphragm 50, the periphery 56 of the second diaphragm 55, the first clamping portion 61, and the second clamping portion 66 are joined together by laser welding over the entire circumferences of the peripheries and clamping portions. Specifically, as shown in FIG. 4B, the four components, which are the periphery 51 of the first diaphragm 50, the periphery 56 of the second diaphragm 55, the first clamping portion 61, and the second clamping portion 66, are stacked on one another. In this state, a laser beam 70 is radiated in the direction perpendicular to the end faces of the components. Edge welding is continuously performed over the entire circumferences of the peripheries 51, 56 and the first and second clamping portions 61, 66 to seal and join the components together. At this time, as represented by the cross-hatched area in FIG. 4B, the diameter d of the end face of a welding region 71 is smaller than the thickness t, which is the sum of the thicknesses of the respective end faces of the periphery 51 of the first diaphragm 50, the periphery 56 of the second diaphragm 55, the first clamping portion 61, and the second clamping portion 66. The diameter of the welding region 71 decreases toward the inner side from the end face of the welding region 71. The welding region 71 is thus exposed in neither the surface of the first clamping portion 61 nor the surface of the second clamping portion 66.

As a result, the extent to which the welding proceeds inward from the end face of the welding region 71, or the amount of penetration, cannot be checked. Even if the end face of the welding region 71 is small, the inward distance of the welding region 71 is not necessarily small. Likewise, even if the end face of the welding region 71 is great, the inward distance of the welding region 71 is not necessarily great. These facts may cause insufficient welding or excessive welding, hampering achievement of an expected welding result. Essential performance of the damper device may thus not be ensured sufficiently. Also, since the conventional welding method adjusts the amount of heat input empirically, maintaining a uniform amount of penetration is difficult.

PRIOR ART DOCUMENT

Patent Document

Patent Document 1: Japanese Laid-Open Patent Publication No. 2013-227877

SUMMARY OF THE INVENTION

Problems that the Invention is to Solve

Accordingly, it is an objective of the present invention to provide a diaphragm damper that allows for checking of the amount of penetration of a welding portion through observation from the outer surface and is capable of controlling the amount of penetration of the welding portion within a certain range.

Means for Solving the Problems

To achieve the foregoing and in accordance with a first aspect of the present invention, a diaphragm damper is provided that includes two diaphragms and a high-pressure chamber that is configured by the two diaphragms and retains a high-pressure gas in a sealed manner. Peripheries of the two diaphragms form an outer rim of the diaphragm damper. The entire circumference of the outer rim is continuously sealed and joined by laser welding. A thickness of a tip of the outer rim is set in correspondence with a spot diameter of a laser beam at the tip of the outer rim. A weld bead is formed by welding in the entire area of the tip of the outer rim.

These characteristics allow for estimation of the amount of penetration based on the outer diameter and width of the weld bead after welding. Also, the heat input at the time the tip of the outer rim starts to melt and the heat output caused by metal heat transfer are balanced in a desired manner. This stabilizes the depth of penetration, thus maintaining a uniform amount of penetration over the entire circumference of the outer rim. Further, even if the center of the laser beam is offset from the center of the thickness of the tip of the outer rim, the weld bead is formed in the entire area of the tip of the outer rim. As a result, without being influenced by the fact that the center of the laser beam is offset from the center of the thickness of the tip of the outer rim, a uniform amount of penetration is maintained. Additionally, even when there is a wavy portion in the outer rim, a uniform amount of penetration is maintained.

The above-described diaphragm damper preferably includes a first cover member and a second cover member, which respectively support the two diaphragms. The first and second cover members each have a clamping portion that clamps the periphery of the corresponding one of the two diaphragms. The clamping portion of the first cover member and the clamping portion of the second cover member each have an outer surface with a gradient. The gradients are each set such that the thickness of the clamping portion decreases toward the tip of the clamping portion.

These characteristics allow the energy caused by the heat input to be gradually diffused inward from the tip of the outer rim. The entire welding region of the outer rim in the thickness direction thus becomes a region of penetration. As a result, the region of penetration can be checked from the outer surface of the outer rim.

In the above-described diaphragm damper, the two diaphragms are preferably each covered by the corresponding one of the first cover member and the second cover member from outside. The peripheries of the diaphragms are stacked on each other. The stacked peripheries are clamped by the clamping portions of the first cover member and the second cover member. The outer rim includes the peripheries of the two diaphragms and the clamping portions of the first cover member and the second cover member.

These characteristics ensure integration of the two diaphragms and the first cover portion and the second cover portion based on the outer diameter and width of the weld bead.

BRIEF DESCRIPTION OF THE DRAWINGS

FIG. 2A is an enlarged partial cross-sectional view showing an outer rim of the diaphragm damper.

FIG. 2B is a partial cross-sectional view showing a welded state at the time the irradiation position of a laser beam is offset from the center x-x.

MODES FOR CARRYING OUT THE INVENTION

An embodiment of the present invention will now be described with reference to the attached drawings based on an example. The scope of the invention is restricted neither to the dimensions, materials, and shapes of the components of the example nor to the relative arrangement of the components, unless otherwise specified.

Example 1

Figure 3:
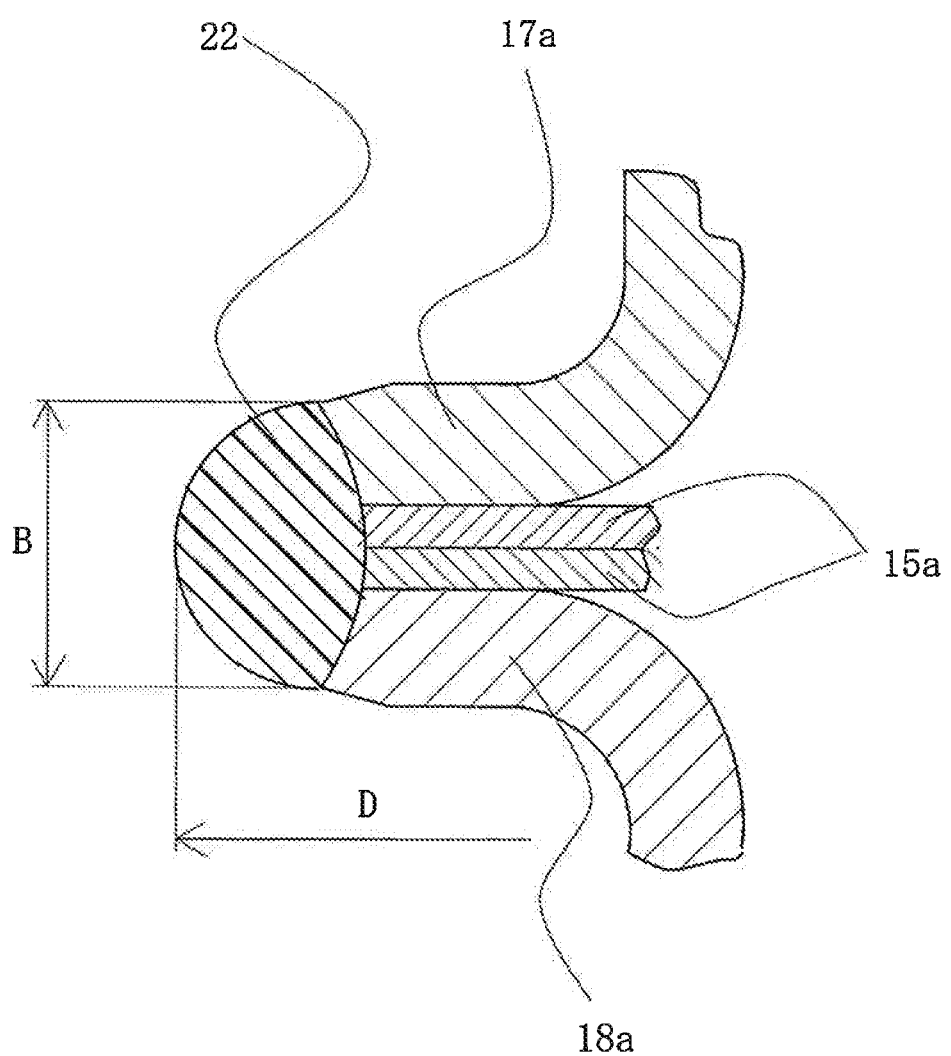
FIG. 3 is a partial cross-sectional view showing a post-welding state of the outer rim of the diaphragm damper.
Figure 4A:
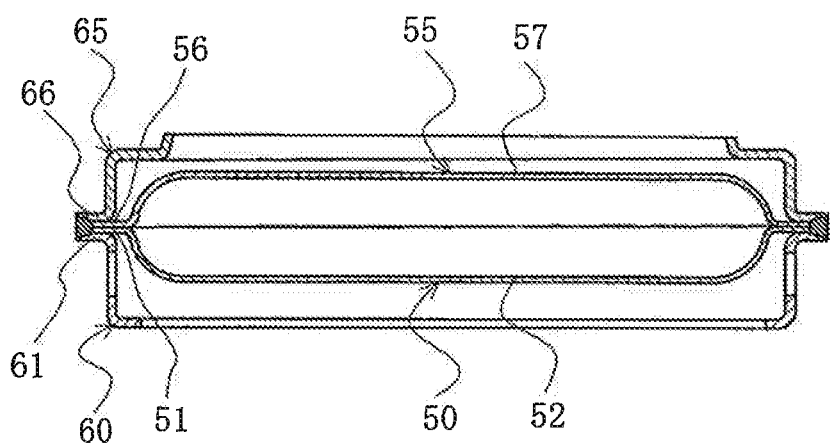
FIG. 4A is a longitudinal cross-sectional view showing a conventional diaphragm damper.
Figure 4B:
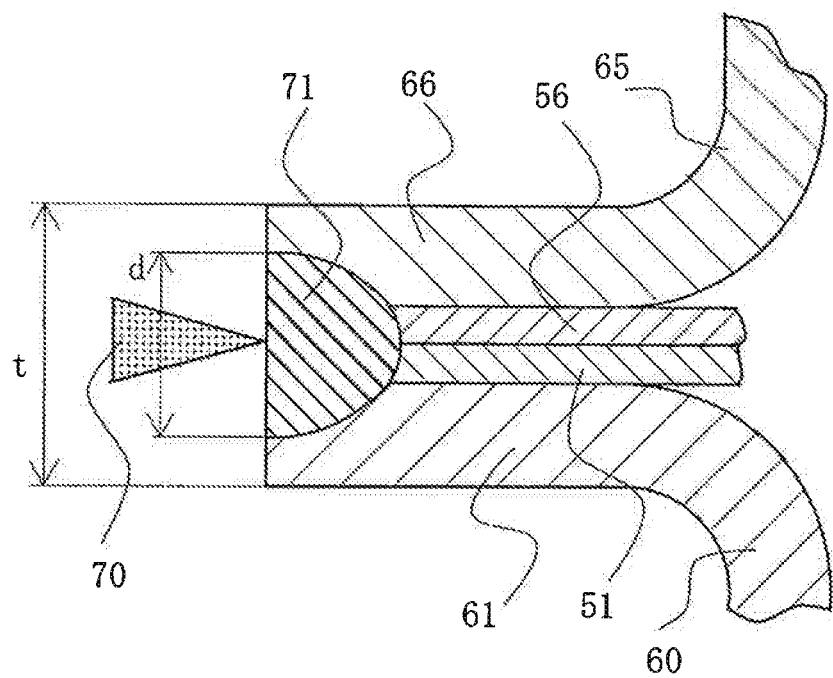
FIG. 4B is a partial cross-sectional view showing a welded state of the diaphragm damper.

A diaphragm damper according to Example 1 of the present invention will now be described with reference to FIGS. 1 to 3. The diaphragm damper according to the present invention is used in a high-pressure pump, which pressurizes fuel supplied from a fuel tank through reciprocation of a plunger and forces the fuel into an injector.

A fuel chamber is formed in the vicinity of a fuel inlet port of this type of high-pressure fuel pump. The high-pressure pump repeats a suction stroke, an adjustment stroke, and a pressurization stroke. The suction stroke draws fuel from the fuel chamber into a pressurizing chamber when the plunger descends. The adjustment stroke returns some of the fuel from the pressurizing chamber into the fuel chamber when the plunger ascends. The pressurization stroke pressurizes the fuel when the plunger continuously ascends after closure of a suction valve. In this manner, the high-pressure pump pressurizes the fuel and discharges the pressurized fuel. The diaphragm damper according to the present invention is used to reduce pulsation that occurs in the fuel chamber of this type of high-pressure pump.

Figure 1:
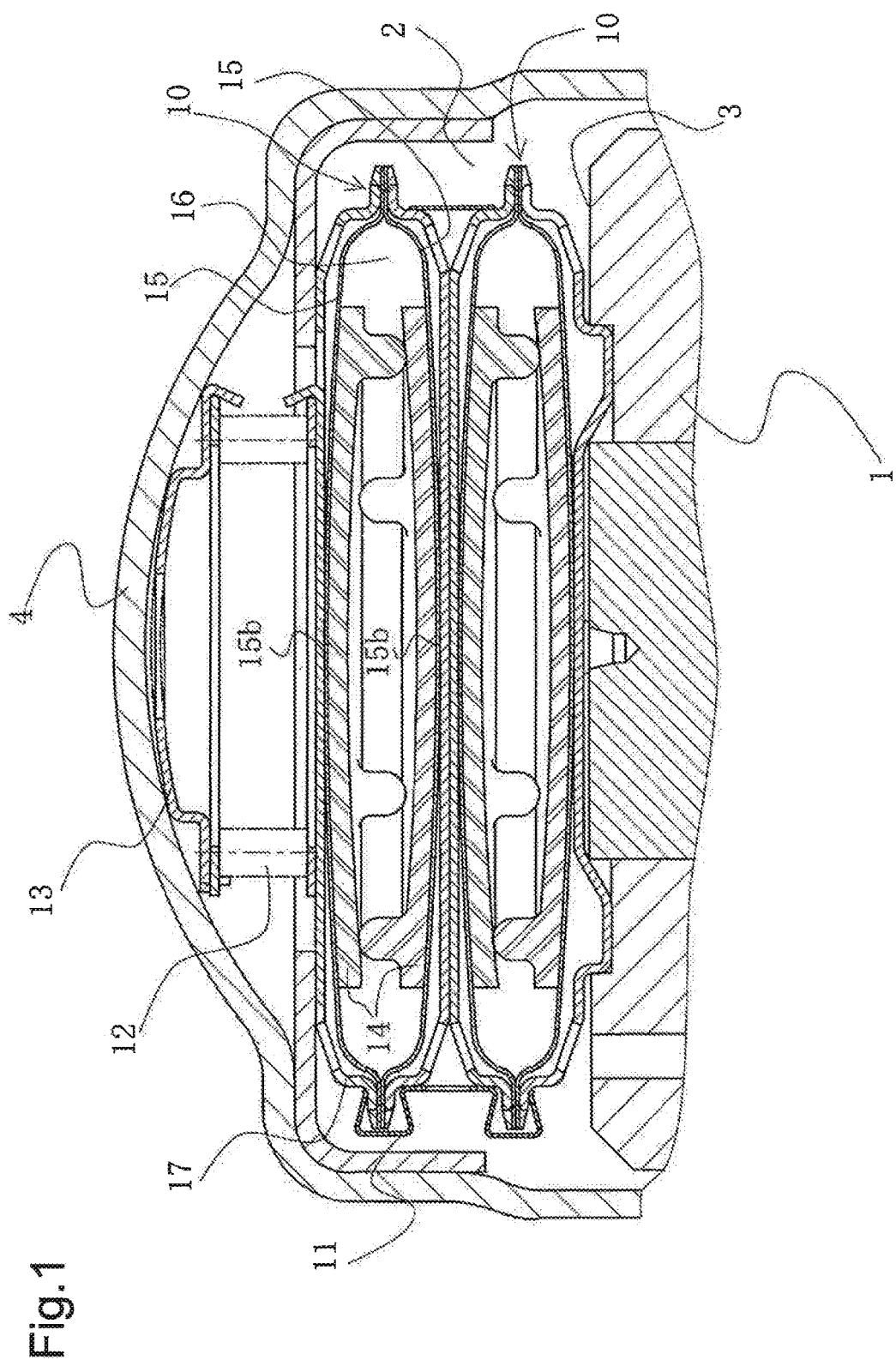
FIG. 1 is a longitudinal cross-sectional view showing a diaphragm damper according to Example 1 of the present invention.

As shown in FIG. 1, a housing 1 of the high-pressure pump has a fuel chamber 2, which is capable of retaining fuel supplied from the exterior. The fuel chamber 2 is formed by an upper section 3 of the housing 1 and an inner surface of a cover 4 of tubular shape with a closed end. The cover 4 covers and is fixed to the upper section of the housing 1. Although not illustrated, a lower section of the cover 4 is joined tightly with the housing 1.

Two diaphragm dampers 10 are arranged in the fuel chamber 2. The diaphragm dampers 10 are aligned in the vertical direction. The basic structure of the upper one of the diaphragm dampers 10 is identical to that of the lower one of the diaphragm dampers 10. The two diaphragm dampers 10 are fixed to each other using a clip 11.

The diaphragm dampers 10 are mounted on the upper section 3 of the housing 1. A holding member 13 is arranged inside the cover 4. A coiled wave spring 12 is fixed to an upper side of the diaphragm dampers 10 by means of the holding member 13. The diaphragm dampers 10 are fixed to the housing 1 by being depressed by the coiled wave spring 12.

Each of the diaphragm dampers 10 has two disk-like diaphragms 15, 15. Each diaphragm damper 10 also has a high-pressure chamber 16, which is configured by the two diaphragms 15, 15 and retains high-pressure gas in a sealed manner. The two disk-like diaphragms 15, 15 are each covered by a corresponding one of a first cover member 17 and a second cover member 18, each having a disk-like shape from outside. Two rubber-like elastic members 14, 14 are arranged in the high-pressure chamber 16 and aligned in the vertical direction.

The two diaphragms 15, 15 are both formed by a flexible thin metal plate and shaped identically. Each of the diaphragms 15, 15 is formed to have a flexible middle portion 15b. The first cover member 17 and the second cover member 18 are formed of metal, support the associated diaphragms 15, 15, and have a greater thickness than the diaphragms 15, 15.

As shown in FIGS. 1 and 2, peripheries 15a, 15a of the diaphragms 15, 15 are stacked on each other. The peripheries 15a, 15a, which are stacked on each other, are clamped by a clamping portion 17a of a periphery of the first cover member 17 and a clamping portion 18a of a periphery of the second cover member 18.

The peripheries 15a, 15a of the diaphragms 15, 15, the clamping portion 17a of the first cover member 17, and the clamping portion 18a of the second cover member form, in a stacked state, an outer rim A of the associated diaphragm damper 10. The outer rim A is sealed and joined continuously by laser welding over the entire circumference of the outer rim A.

During the laser welding, the first cover member 17 is held by a first jig 19 and the second cover member 18 is held by a second jig 20. Also, by bringing the first jig 19 and the second jig 20 close to each other, the peripheries 15a, 15a of the diaphragms 15, 15, the clamping portion 17a of the first cover member 17, and the clamping portion 18a of the second cover member 18 are maintained in a tight mutual contact state.

Seam welding using YAG laser, for example, is used as the laser welding. At the time of welding, the two diaphragms 15, 15, the first cover member 17, and the second cover member 18, which are held by the first jig 19 and the second jig 20, are rotated about the vertical axis as viewed in FIG. 2A. Meanwhile, a laser beam L is radiated onto the outer rim A, which is formed by the peripheries 15a, 15a of the two diaphragms 15, 15, the clamping portion 17a of the first cover member 17, and the clamping portion 18a of the second cover member 18, from an exit unit 21 of a laser device in the direction perpendicular to the rotation axis. In this manner, the entire circumference of the outer rim A is welded. This forms a weld bead 22 over the entire circumference of the outer rim A, thus tightly sealing the high-pressure chamber 16.

According to the present invention, the thickness t of the tip of the outer rim A is set in correspondence with the spot diameter d of the laser beam L at the tip of the outer rim A. The spot diameter d represents the diameter of the region in which irradiation of the laser beam L thermally melts the material at and about the focused spot. The spot diameter d is greater than the optical focused size at the processing point.

Typically, to support the diaphragms 15, 15, components with great thickness are used as the first cover member 17 and the second cover member 18. The thickness t of the tip of the outer rim A is thus greater than the spot diameter d of the laser beam L at the tip of the outer rim A.

In the present example, as shown in FIG. 2A, the clamping portion 17a of the first cover member 17 and the clamping portion 18a of the second cover member have an outer surface with a gradient 17b and an outer surface with a gradient 18b, respectively. The gradients 17b, 18b are each set such that the thickness of the associated clamping portion 17a, 18a decreases toward the tip of the clamping portion. Each of the gradients 17b, 18b is also set such that the thickness t of the tip of the outer rim A and the spot diameter d of the laser beam L are substantially equal to each other.

To ensure irradiation of the laser beam L onto the full range of the tip of the outer rim A in the thickness direction, it is sufficient if the spot diameter d of the laser beam L and the thickness t of the tip of the outer rim A satisfy the expression: spot diameter d>thickness t. However, to meet the requirement regarding the strength, the thickness t of the tip of the outer rim A must not be excessively small. On the other hand, the spot diameter d of the laser beam L is determined depending on the welding conditions such as the laser device and the material of the welding target.

Further, as will be described below, the outer rim A has a portion that is wavy to some extent due to its manufacturing errors. With the wavy portion taken into consideration, it is preferable to set the spot diameter d of the laser beam L slightly greater than the thickness t of the tip of the outer rim A.

When the thickness t of the tip of the outer rim A and the spot diameter d of the laser beam L are set substantially equal to each other, the heat input at the time the tip of the outer rim A starts to melt and the heat output due to metal heat transfer are balanced in a desired manner. This stabilizes the depth of penetration h, thus maintaining a uniform amount of penetration over the entire circumference of the outer rim A.

At the start of welding, the entire surface of the tip of the outer rim A is a region of penetration. As a result, as shown in FIG. 3, the weld bead 22 is formed in the entire area of the tip of the outer rim A after welding. This allows for estimation of the amount of penetration based on the outer diameter D and the width B of the weld bead 22 after welding.

The clamping portion 17a of the first cover member 17 and the clamping portion 18a of the second cover member 18 have the outer surface with the gradient 17b and the outer surface with the gradient 18b, respectively. Each gradient 17b, 18b is set such that the thickness of the associated clamping portion 17a, 18a decreases toward the tip of the clamping portion. This allows the energy produced by the heat input to be gradually diffused inward from the tip of the outer rim A. The entire welding region of the outer rim A in the thickness direction thus becomes a region of penetration. As a result, the region of penetration can be checked from an outer surface of the outer rim A.

Welding in a case in which the irradiation position of the laser beam is offset from the center will hereafter be described with reference to FIG. 2B.

For example, it is now assumed that the center of the laser beam is offset downward from the center x-x of the thickness t of the tip of the outer rim A. According to the present invention, the tip of the outer rim A has a small volume. Therefore, even when the center of the laser beam is offset downward from the center x-x, the limit of the lower end of the weld bead 22 is the lower end of the outer rim A. The weld bead 22 is thus not enlarged beyond the lower end of the outer rim A. On the other hand, the upper end of the weld bead is formed to extend to the upper end of the outer rim A. The weld bead 22 is thus formed in the entire area of the tip of the outer rim A. As a result, there is no influence caused by the fact that the center of the laser beam is offset from the center x-x of the thickness t of the tip of the outer rim A. A uniform amount of penetration is thus maintained.

Particularly, in a case in which welding is performed by radiating the laser beam L while rotating the two diaphragms 15, 15, the first cover member 17, and the second cover member 18, there may be a portion that is wavy to some extent in the outer rim A. In this case, a conventional welding method may vary the amount of penetration. However, the present invention is capable of maintaining a uniform amount of penetration.

The above-described Example 1 achieves the following remarkable advantages.

(1) The thickness t of the tip of the outer rim A is set in correspondence with the spot diameter d of the laser beam L. In this configuration, the weld bead 22 is formed in the entire area of the tip of the outer rim A after welding. This allows for estimation of the amount of penetration based on the outer diameter D and the width B of the weld bead after welding.

(2) The thickness t of the tip of the outer rim A is set substantially equal to the spot diameter d of the laser beam L. In this configuration, the heat input at the time the tip of the outer rim A starts to melt and the heat radiation due to metal heat transfer are balanced in a desired manner. This stabilizes the depth of penetration h, thus maintaining a uniform amount of penetration over the entire circumference of the outer rim A.

(3) The clamping portion 17a of the first cover member 17 and the clamping portion 18a of the second cover member 18 have the outer surface with the gradient 17b and the outer surface with the gradient 18b, respectively. Each gradient 17b, 18b is set such that the thickness of the associated clamping portion 17a, 18a decreases toward the tip of the clamping portion. This allows the energy produced by the heat input to be gradually diffused inward from the tip of the outer rim A. The entire welding region of the outer rim A in the thickness direction thus becomes a region of penetration. As a result, the region of penetration can be checked from an outer surface of the outer rim A.

(4) The tip of the outer rim A has a small volume. Therefore, even if the center of the laser beam is offset from the center x-x of the thickness t of the tip of the outer rim A, the weld bead 22 is formed in the entire area of the tip of the outer rim A. As a result, there is no influence caused by the fact that the center of the laser beam is offset from the center x-x of the thickness t of the tip of the outer rim A. A uniform amount of penetration is thus maintained.

(5) In a case in which welding is performed by radiating the laser beam L while rotating the two diaphragms 15, 15, the first cover member 17, and the second cover member 18, there may be a portion that is wavy to some extent in the outer rim A. Even in this case, a uniform amount of penetration is maintained.

Although the example of the present invention has been described with reference to the drawings, the specific configuration is not restricted to the example. The invention includes modifications and additions within the scope that does not depart from the gist of the invention.

In the above-described example, the gradient 17b of the clamping portion 17a of the first cover member 17 and the gradient 18b of the clamping portion 18a of the second cover member 18 are each varied linearly such that the thickness of the associated clamping portion 17a, 18a decreases toward the tip of the clamping portion 17a, 18a. However, each gradient 17b, 18b may be varied in a curved manner to form a convex shape or a concave shape.

In the above-described example, the thickness t of the tip of the outer rim A is described as set to be substantially equal to the spot diameter d of the laser beam L. Also, the spot diameter d of the laser beam L is described as set to be slightly greater than the thickness t of the tip of the outer rim A. In other words, it is sufficient if the thickness t of the tip of the outer rim A is set in correspondence with the spot diameter d of the laser beam L such that the weld bead 22 is formed in the entire area of the tip of the outer rim A after welding.

DESCRIPTION OF THE REFERENCE NUMERALS

1 . . . Housing, 2 . . . Fuel Chamber, 3 . . . Upper Section of Housing, 4 . . . Cover, 10 . . . Diaphragm Damper, 11 . . . Clip, 12 . . . Coiled Wave Spring, 13 . . . Holding Member, 14 . . . Rubber-Like Elastic Member, 15 . . . Diaphragm, 15a . . . Periphery, 15b . . . Middle Section, 16 . . . High-Pressure Chamber, 17 . . . First Cover Member, 17a . . . Clamping Portion, 17b . . . Gradient, 18 . . . Second Cover Member, 18a . . . Clamping Portion, 18b . . . Gradient, 19 . . . First Jig, 20 . . . Second Jig, 21 . . . Exit Unit, 22 . . . Weld Bead, A . . . Outer Rim, L . . . Laser Beam, t . . . Thickness of Tip of Outer Rim, d . . . Spot Diameter of Laser Beam at Tip of Outer Rim, h . . . Depth of Penetration

The invention claimed is:

1. A diaphragm damper comprising:
two diaphragms;
a high-pressure chamber that is configured by the two diaphragms and retains a high-pressure gas in a sealed manner, and
a first cover member and a second cover member, which respectively support the two diaphragms,
wherein
peripheries of the two diaphragms form an outer rim of the diaphragm damper,
the entire circumference of the outer rim is continuously sealed and joined by laser welding,
a thickness of a tip of the outer rim is set in correspondence with a spot diameter of a laser beam at the tip of the outer rim,
a weld bead is formed by welding in the entire area of the tip of the outer rim,
the first and second cover members each have a clamping portion that clamps the periphery of the corresponding one of the two diaphragms, and
the clamping portion of the first cover member and the clamping portion of the second cover member each have an outer surface with a gradient, wherein the gradients are each set such that the thickness of the clamping portion decreases toward the tip of the clamping portion.

2. The diaphragm damper according to claim 1, wherein the two diaphragms are each covered by the corresponding one of the first cover member and the second cover member from outside, wherein
the peripheries of the diaphragms are stacked on each other, and
the stacked peripheries are clamped by the clamping portions of the first cover member and the second cover member, and
the outer rim includes the peripheries of the two diaphragms and the clamping portions of the first cover member and the second cover member.

* * * * *